United States Patent [19]

Konietzni et al.

[11] Patent Number: 4,814,052

[45] Date of Patent: Mar. 21, 1989

[54] METHOD FOR THE ELECTROCHEMICAL PROCESSING OF WORKPIECES

[75] Inventors: H. J. Konietzni, Gladbeck; B. Wolter; E. Zok, both of Remscheid, all of Fed. Rep. of Germany

[73] Assignee: AEG-Elotherm GmbH, Ramscheid-Hasten, Fed. Rep. of Germany

[21] Appl. No.: 141,034

[22] Filed: Jan. 5, 1988

[30] Foreign Application Priority Data

Mar. 21, 1987 [DE] Fed. Rep. of Germany ....... 3709433

[51] Int. Cl.4 .............................................. B23H 3/02
[52] U.S. Cl. .............................. 204/129.2; 204/129.25
[58] Field of Search ........... 204/129.2, 129.25, 224 M, 204/228

[56] References Cited

U.S. PATENT DOCUMENTS

| | | | |
|---|---|---|---|
| 3,440,156 | 4/1969 | Dickson | 204/224 M |
| 3,463,720 | 8/1969 | Wilkinson et al. | 204/224 M |
| 3,468,775 | 9/1969 | Lanning et al. | 204/129.25 |
| 3,859,186 | 7/1975 | Ullmann et al. | 204/129.25 |
| 4,213,834 | 7/1980 | Semashko et al. | 204/129.25 |
| 4,257,865 | 3/1981 | Semashko et al. | 204/129.25 |

FOREIGN PATENT DOCUMENTS

| | | |
|---|---|---|
| 2012648 | 8/1979 | United Kingdom . |
| 2041574 | 9/1980 | United Kingdom . |
| 2075401 | 11/1981 | United Kingdom . |
| 81/00532 | 3/1981 | World Int. Prop. O. . |

Primary Examiner—Donald R. Valentine
Attorney, Agent, or Firm—Sprung Horn Kramer & Woods

[57] ABSTRACT

The invention relates to an apparatus for the electrochemical processing of workpieces. The apparatus comprises a processing electrode (2) adjustable in relation to the workpiece (1) and a supply unit (3) for the electric working value supplied to the workpiece (1). The store (8) comprises in the form of digital measured values the course in time during processing of the working value detected by a measuring system (5). In a comparison stage (7) the stored course in time of the working value, serving as a required value, is compared with the course delivered by the measuring system (5) (actual value), and a control signal is delivered to the supply unit (3) when a given difference between the required and actual values is exceeded.

2 Claims, 1 Drawing Sheet

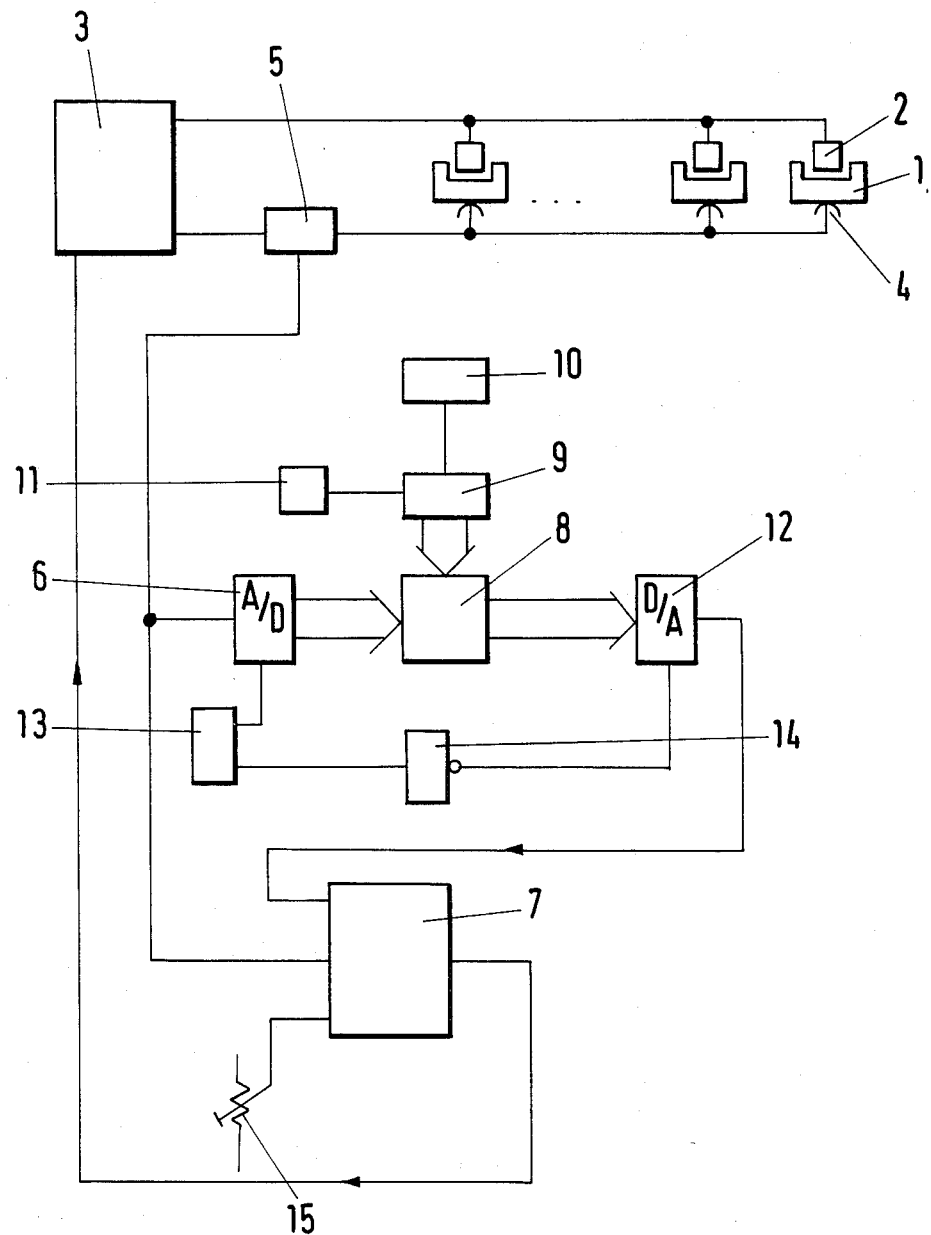

4,814,052

METHOD FOR THE ELECTROCHEMICAL PROCESSING OF WORKPIECES

BACKGROUND OF THE INVENTION

The invention relates to an apparatus for the electrochemical processing of workpieces, more particularly for electrochemical countersinking, having a processing electrode (tool) and a supply unit for for the electric working value (current/voltage) supplied to the workpiece.

In the electrochemical processing of workpieces the processing electrode encloses with the workpiece a working gap which is filled with an electrolyte. In an apparatus known from German Pat. Specification No. 3 032 757 in the case of a short circuit in the working gap between the electrode and the workpiece the working voltage of the rectifier is switched off by a short circuit switch and in this way the tool and workpiece are protected against damage by excess currents.

SUMMARY OF THE INVENTION

However, when a plurality of workpieces are processed simultaneously with apparatuses of the prior art kind, contact scaling frequently occurs at the connecting place between the supply of the electric working value and of individual simultaneously processed workpieces.

The interruption of the current supply in individual current paths does not lead to a switching-off of the working voltage. Workpieces in staisfactory current paths are also properly processed. The cathodes in the disturbed current paths move at a sometimes high feed speed towards the workpiece, so that the workpiece and/or tool are mechanically damaged.

It is therefore an object of the invention to provide an apparatus and method for the electrochemical processing of workpieces which prevents the workpiece and tool from getting damaged by operating disturbances caused by the interruption of the working circuit.

To this end an apparatus of the kind specified is according to the invention characterized by a store for the course in time of the electric working value detected by a measuring system and by a comparison stage for the comparison of the stored course of the working value, serving as a required value, with the course in time supplied as an actual value by the measuring system, the comparison stage delivering a control signal to the supply unit when a given difference between the required and actual values is exceeded. The invention also provides a method for the electrochemical processing of workpieces, wherein a processing electrode (tool) is adjusted in relation to the workpiece, which is supplied with an electric working value (current/voltage) from a supply unit, the processing operation being interrupted when a comparison stage detects that a permissible difference between a required value read out of a store and an actual value, detected by a measuring system, of the electric working value has been exceeded.

Advantageous embodiments of the invention are characterized in the subclaims.

According to the invention first of all, immediately following the optimum adjustment of the electrochemical processing apparatus, the course in time of the electric working value during the processing operation on the first workpiece is read into a store. The course of this measured value thereafter serves as a stated required value. During the processing of the following workpieces, for each of which also the course in time of the working value is monitored, a comparison stage detects that the permissible limits of required/actual value has been exceeded, for example, due to a disturbance of the adjusted working parameters or the scaling of the contact between the supply of the electric working value and the workpiece, and interrupts the processing operation. As a result, on the one hand the workpiece deviations outside the permissible manufacturing tolerances are obviated and workpiece and tool are prevented from being damaged by moving uncontrollably towards one another.

BRIEF DESCRIPTION OF THE DRAWINGS

An embodiment of the invention will now be described in greater detail with reference to the drawing wherein the FIGURE is a block diagram of a system according to the invention.

DETAILED DESCRIPTION OF THE INVENTION

An apparatus for the electrochemical processing of workpieces comprises a workpiece 1 and a processing electrode (tool) 2 which can be adjusted in a conventional manner in relation to the workpiece 1, the two elements enclosing a working gap filled with an electrolyte. The processing apparatus is connected to the output of a supply unit 3, which contains a direct current source and supplies the working current for the processing operation, the voltage applied to the workpiece 1 being kept constant by the supply unit 3. While the tool 2 is at ground potential, the plus potential of the supply unit 3 is connected via a contact 4 to the workpiece 1.

The working current absorbed by the workpiece 1 is measured by a measuring system 5 which contains, for example, a shunt. The output of the measuring system 5 is connected on the one hand to the input of an analog to digital converter 6 and the actual value input of a camparison stage 7, which is constructed as a window discriminator and whose window width can be adjusted by a potentiometer 15. The digitalized output signal of the converter is transmitted to a non-volatile, but electrically cancellable read-write memory 8 ($E^2PROM$). The store 8 is timed by a quartz-controlled oscillator 10, the elementary frequency being adjustable by a divider/counter 9 connected between the oscillator 10 and the store 8. The divider/counter 9 is activated and switched off via a start/stop device 11. The data read out of the store 8 are supplied to a digital to analog converter 12, whose output forms the required value input of the comparison stage, whose output is connected to the supply unit 3. The particular function of the store 8 (write-read) is switched over via a control signal transmitter 13 which is connected directly to the analog to digital converter 6 and via an inverter 14 to the digital to analog converter 12.

The circuit components described in this embodiment cooperate as follows:

When the electrochemical processing apparatus has been adjusted to the required operating conditions (e.g., feed), the operation of processing the first workpiece 1 produces the given desired values in the store 8. When the processing operation starts, the divider/counter 9 is also activated via the start/stop device 11. The store is brought to the writing function via the control signal transmitter by setting the analog to digital converter 6. The course in time of the working current flowing to the workpiece 1 is measured by the converter 5 and converted by the analog to digital converter into digital measured values, which are deposited in the store 8. On completion of the processing operation, the divider/counter 9 is stopped via the start/stop device 11, so that the course of the measured value, serving as the required value for the processing of further workpieces, is stored in the form of digital measured values in the store 8. When the next processing operation starts, the divider/counter is restarted, but the store 8 is switched over by the control signal transmitter into the reading function, so that the digital to analog converter 12 is activated, at whose output the measured values stored in the store 8 are present as analog reference signals for the required value input of the comparison stage 7. Synchronously with reading out the required values, the current transformer 5 reproduces the course of the particular actual value working current which is now compared with the required value in the comparison stage 7.

If now during the processing of the workpiece the processing conditions change as against the conditions measured on the first workpiece, for example, due to scaling of the contact 4 bearing against the workpiece 1, this is announced at the output of the comparison stage 7 by the delivery of an alarm signal to the supply unit 7. As a result, the processing operation is interrupted, so that the processing electrode cannot be displaced further towards the workpiece 1 in an uncontrollable manner, thus preventing mechanical damage to the workpiece 2 or the tool 1.

In dependence on the selection of the window width of the comparison stage 7 on the basis of the adjustment of the potentiometer 15 the threshold for triggering the alarm function can be preselected. Advantageously it is so narrowly adjusted that even slight deviations of the working current from the required value course are indicated. This enables the manufacturing tolerances required for the workpiece 1 to be maintained.

In dependence on the speed of the processing operation, the scanning rate of the converters 6,12 and the elementary frequency of the store 8 can be adjusted by the divider function of the divider/counter 9 so as to obtain optimum utilization of the store contents available. However, an application of the apparatus according to the invention to electrochemical deburring is also conceivable, the only difference from electrochemical countersinking being that during deburring the working voltage applied to the workpiece is monitored by the measuring system 5, while the current is maintained constant by the supply unit 3.

We claim:

1. A method for the electrochemical processing of a series of workpieces, comprising the steps of:
    adjusting the position of a processing electrode in relation to a first workpiece to be processed;
    supplying electrical energy to the processing electrode;
    measuring electrical working values applied to the tool or the first workpiece over time during processing;
    storing the electrical working values for the first workpiece as reference values;
    measuring the working values applied over time to subsequent workpieces; and
    interrupting the processing of subsequent workpieces when the measured values differ from the stored values by more than a predetermined difference.

2. The method according to claim 1, wherein comparison is made between the stored values and measured values which correspond in time during the processing of the first workpiece and subsequent workpieces.

* * * * *